April 7, 1970          A. C. BROOKS          3,504,707

COAXIAL CYLINDER OPERATED 5-PORTED DOUBLE ACTING POPPET VALVE

Filed April 26, 1967

*Alan C. Brooks*
MECH. ENGR.
—INVENTOR—

United States Patent Office 3,504,707
Patented Apr. 7, 1970

3,504,707
COAXIAL CYLINDER OPERATED 5-PORTED DOUBLE ACTING POPPET VALVE
Alan C. Brooks, Irvington, N.J.
(P.O. Box 747, Union, N.J. 07083)
Filed Apr. 26, 1967, Ser. No. 634,008
Int. Cl. F16k *31/12*
U.S. Cl. 137—625.66          1 Claim

ABSTRACT OF THE DISCLOSURE

A valve is disclosed which includes a body member having an internal passageway along its longitudinal axis with the body member having a plurality of ports transversely intersecting the internal passageway thereof. A spool is located in the internal passageway and is movable between a first and second position. The spool includes pistons at opposite ends thereof and at least one enlarged poppet means intermediate its ends thereof which establishes preselected flow paths through the ports and the internal passageway of the body member in accordance with whether the spool is in its first or second position. A pair of end caps threadably engage opposite ends of the internal passageway of the body member. Such end caps include a cylinder portion which receives the aforementioned pistons of the spool and such end caps further include an enlarged head portion having an aperture by means of which fluid pressure can be conveyed into the cylinder portion thereof against the associated piston of the spool. Additionally such enlarged head portion functions as a stop to limit the travel of the end caps when they are screwed into the body member.

---

This invention pertains to 5-ported directional valves that can be used in either one or two pressure systems and operated by pilot pressure supplied from within or without of the valve.

A review of the present state of the art in directional flow control valves used in industry reveals the fact that the design of the majority of the better known valves dates back twenty years or more, are very bulky and have many parts. To service these valves requires a lot of time, parts and tools.

Some of these valves have cast bodies with complicated internal coring requiring auxiliary manifolds for valve porting. These manifolds require a gasket and screws for attachment to a machined face of the body. Some valves have O ring grooves machined in the bore of the body, making installations and removal of the seals difficult and time consuming. Other valves have O rings installed in the body bore and spaced apart by a number of spacers or "packers." This is undesirable because these packers must be removed to replace the O rings and are easily lost or damaged. Still others have a precision honed sleeve installed in a cored cast body. Within this sleeve a precision fitted close tolerance spool operates to provide directional flow control. When the metal to metal contact wears out the close tolerance fit, valve leakage occurs which cannot be economically repaired.

Another type of valve has the O rings or other suitable seals mounted directly on the spool. This design requires installation of a sleeve in the cored body with a series of small holes drilled radially in the sleeve and connecting directly to the cored passages. To provide directional flow control, the spool must reciprocate across these holes in the sleeve, causing nibbling of the seals and premature valve failure.

It is the purpose of this invention to show how all of the above designs can be reduced to a valve body, spool and two threaded end capping coaxial cylinders exclusive of seals, all of which can be machined from standard bar stock sizes, eliminating pattern equipment, castings, screws or fastening devices, and which can be assembled without tools of any kind.

It is to be understood that these parts in combination are of the essence of my invention of a coaxial cylinder actuated double acting poppet valve, the specific construction of which constitutes what is known in the trade as a pilot pressure operated 4-way or 5-way directional flow control valve, pilot pressure being supplied from within the valve or from an external source.

The valve body of my invention of a coaxial cylinder actuated double acting poppet valve is preferably fabricated from although not limited to small sizes of rectangular bar stock to permit stacking a number of valves one upon the other without space between them like pancakes. This feature permits a large reduction in the size of the machine control panel, especially where a large number of valves are used. For example, a dozen of these valves can be bolted together that will not be over 12 inches in height. The bulky, sculptured design of the valves mentioned above makes stacking them in close pancake form impossible.

The four parts of my invention of a double acting poppet valve constitute a great simplification and improvement over the designs mentioned above as will be more readily apparent and understood from the accompanying drawing and the following description:

Figure 1:
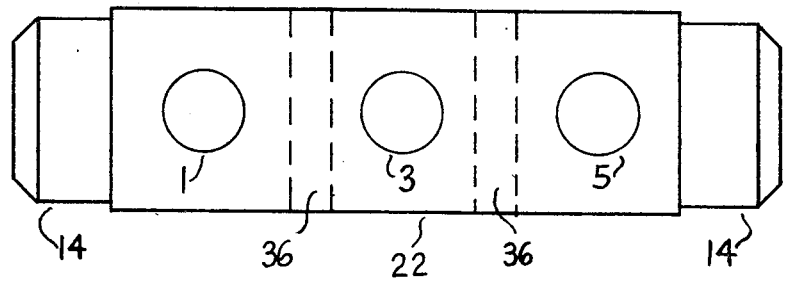
FIG. 1 is a front view of the coaxial cylinder actuated double acting poppet valve.

The construction and detailed function of the four parts of my invention are identified by means of identical numerical references in all figures and used in the following detailed description of function, design and construction:

By definition, a poppet is a device capable of opening or closing an orifice in a very short linear movement with the actuation time being practically instantaneous. It is to be specifically understood that the construction of my invention is by this definition a double acting poppet valve as will be more fully shown and described.

Seals 11 and 12 mounted in grooves 35 on spool 13 move a very short distance to open or close the orifices created by the relatively narrow lands 15, 16, 17 and 18 in valve body 22 whose diameter is smaller than the relieved passages 27, 28 and 29. Seals 11 and 12 are to be regarded as the actual poppet devices and will be referred to hereafter as poppets 11 and 12. The relieved passages 27, 28 and 29 provide clearance for poppets 11 and 12 in their traverse from one orifice to the other without coming into contact with port holes 2, 3 and 4, preventing nibbling of the poppet seals. Each orifice has an angular approach 24 formed on each side of each land to aid in the constriction and entering of the pliable poppet seals into the orifices without nibbling and resulting valve failure. I have determined by trial that the best angle for constriction and entering of the poppet seals is any angle less than 30° and it is to be considered as one of the essential parts of this invention, since it has been found that greater angles than 30° shorten the life of the poppet seals.

Figure 2:
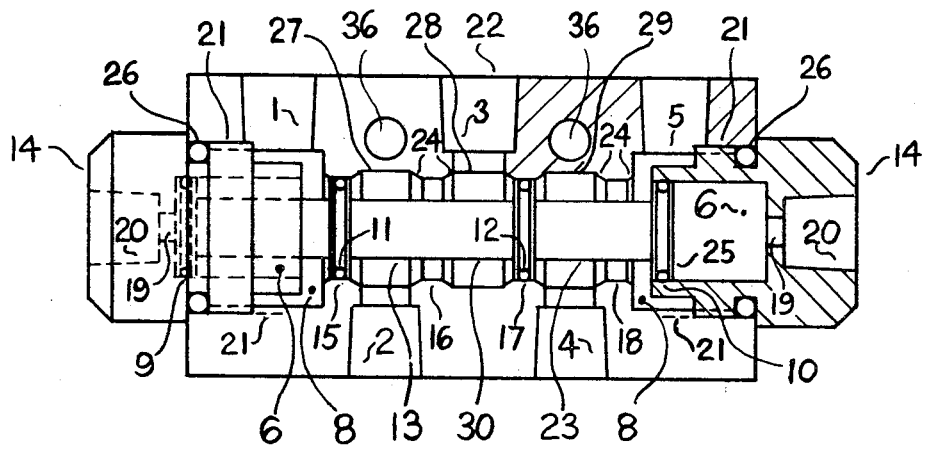
FIG. 2 is an axial section through the plan view of FIG. 1, showing the internal construction of the body with the spool and end capping coaxial cylinders assembled in operating position.

Poppets 11 and 12 operate to alternately open or close orifices 15, 16, 17 and 18 as shown in FIG. 2 when reciprocated by two pistons 25 attached to piston rods 23 operating in the two single acting cylinders 6 when pressure is either released or supplied from one cylinder port 20 or the other. Seals 9 and 10 are the seals for pistons 25. Since spool 13 is of balanced pressure design, spool 13 carrying poppets 11 and 12 will not move from left to right or vice versa unless one of the two ports 20 has had pressure released from it or one of the two ports 20 has had external pressure supplied to it while the opposite port 20 is opened to exhaust.

Poppets 11 and 12 are connected and spaced apart by stem 30 which is a part of spool 13. When spool 13 is in the position shown, poppets 11 and 12 simultaneously seal off orifices 15 and 17, and open orifices 16 and 18 to flow. The ends of spool 13 are supported throughout the length of its travel during reciprocation by the single acting cylinders 6 which serve also as a positive mechanical stop to limit the travel. Holes 19 connect with cylinder ports 20 for supply or discharge of pressure.

Figure 3:
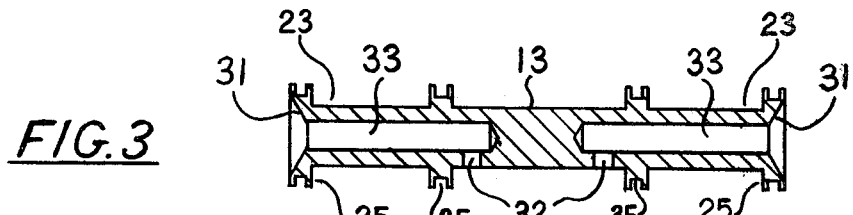
FIG. 3 is a front view of the spool without seals, showing the construction for internal pilot pressure operation.

FIG. 3 shows the construction of spool 13 when the valve is to be operated by internal pressure supplied to the valve through valve port 3. Pressure is instantly conveyed to each end of spool 13 through holes 32 and 33 establishing equal pressures on both pistons 25 as long as cylinder ports 20 remain closed. Both ends of spool 13 have an annular relief 31 connected with holes 33 so that the full cross sectional area of spool 13 is exposed to pressure.

When spool 13 is in position shown in FIG. 2, momentary opening of the right hand port 20 will cause an instantaneous pressure drop in right hand cylinder 6 so that the higher pressure acting on left hand piston 25 causes instantaneous shift of spool 13 to its right hand extremity, simultaneously opening orifices 15 and 17 to flow and sealing off orifices 16 and 18. Within a few milli-seconds after closing right hand port 20, pressure builds up on right hand piston 25 to equal the pressure on left hand piston 25. Momentary opening of left hand port 20 reverses this process. This type of pilot pressure operation is known to the trade as pressure bleed operation.

When the valve is to be operated by an external source of pressure other than that supplied through valve port 3, holes 32 and 33 are omitted and both cylinder ports 20 are left open to the atmosphere. A momentary pressure signal applied to the left hand piston 25 will cause spool 13 in FIG. 2 to shift to its right hand extremity. A momentary pressure signal then applied to right hand piston 25 reverses the process, and spool 13 then returns to the left hand position shown.

Valve ports 2 and 4 alternately supply pressure to a cylinder and exhaust this pressure through ports 1 and 5 when the valve is used as a 4-way single pressure valve. When valve is to be used as a 2 pressure selector valve, one pressure is admitted through valve port 1 and the other pressure is admitted through valve port 5 with valve port 3 becoming the common exhaust port for both pressures. In this type of operation, the valve becomes what is known to the trade as a 5-way 2 pressure valve and shifting of the spool 13 must be accomplished by supplying external pressure as noted above.

The actual means for supplying or releasing pressure alternately from cylinder ports 20 are not shown and do not constitute a part of this invention, inasmuch as such means are well known and commonly used.

Figure 4:
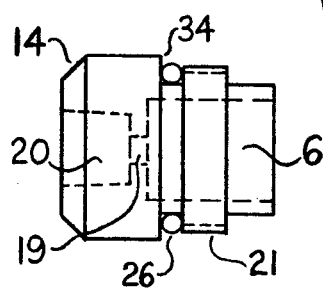
FIG. 4 is a front view of an end capping single acting coaxial cylinder and O ring assembly.

Referring again to the FIG. 2, it will be seen that single acting cylinders 6 in threaded end caps 14 are of one piece construction and are attached to valve body 22 by screwing the threaded portion 21 into the counterbored and mating threaded portion 21 of valve body 22 until stopped by shoulder 34 in FIG. 4. Seals 26 prevent leakage past shoulders 34.

The open ends of cylinders 6 are sufficiently shorter than the central counterbored ends 8 of the valve body 22 to permit free flow around the reduced diameter of the unthreaded portion of cylinders 6 and connecting with valve ports 1 and 5. Cylinders 6 also serve to align and maintain spool central in the bore of the body 22. The diameter of spool 13 is sufficiently smaller than the diameter of the cylinders 6 and orifices 15, 16, 17 and 18 to insure no metal to metal contact.

It is to be specifically noted here that threaded end capping single acting cylinders 14 are coaxially mounted within the cylindrical cavities created by counterbores 8 in each end of valve body 22. This arrangement reduces the overall length of the valve, inasmuch as the pressure actuating cylinders 6 are located coaxially within the body 22. The construction of this invention reduces space requirements 25% to 50% of the space required by the previously described valves whose pressure actuating cylinders are of bulky external construction and attached to the ends of the valve bodies with screws or other fastening devices. Holes 36 in valve body 22 are for attaching valve to a surface or bolting a number of valves together in pancake form to conserve space.

Assembly of my double acting poppet valve consists of merely screwing one end capping cylinder 14 into one end of valve body 22 followed by inserting spool 13 with previously assembled seals into body 22 from the other end and then screwing the other end capping cylinder 14 into the other end of body 22. All of this is done without tools in less than 2 minutes manually. Disassembly requires about the some time, being the reverse of the above.

In this novel construction of my coaxial cylinder actuated double acting poppet valve, I claim:

1. A valve comprising;
   a body member having an internal passageway along its longitudinal axis, said body member having a plurality of ports transversely intersecting said internal passageway;
   a spool located in said internal passageway and movable therein between first and second positions, said spool including at least one enlarged poppet means intermediate its ends thereof for establishing preselected flow paths through preselected ones of said ports and said passageway in accordance with whether said spool is situated in its first or second position, said spool further including enlarged pistons at opposite ends thereof; and
   a pair of end caps removably secured to said body member at opposite ends of said longitudinal axis thereof by means of a screw threaded engagement with the internal surfaces of said body member which define said internal passageway, each of said end caps including;
      a cylinder portion which slidably receives a respective one of said pistons, and aperture means for conveying a fluid to said cylinder portions,
      and wherein said end caps further include a head portion through which said aperture means passes, and wherein said aperture means each end cap is coaxially aligned with the longitudinal axis of said spool; and
   wherein said spool includes a pair of internal channels, each of said channels being coaxially aligned with said longitudinal axis of said spool and extending from one end of said spool to a respective point intermediate the ends of said spool, said spool further including a pair of holes, each of said holes communicating at one end thereof with one of said channels and at the other end thereof with said internal passageway of said body member.

References Cited

UNITED STATES PATENTS

| | | | |
|---|---|---|---|
| 696,135 | 3/1902 | Curtis | 251—43 |
| 2,700,986 | 2/1955 | Gunn | 251—31 XR |
| 2,880,755 | 4/1959 | Brown | 251—31 |
| 1,131,182 | 3/1915 | Turner | 137—625.66 |
| 2,414,451 | 1/1947 | Christensen | 137—625.69 XR |
| 2,531,511 | 11/1950 | Hill | 137—625.68 |
| 2,577,999 | 12/1951 | Christensen | 137—625.68 |
| 2,675,024 | 4/1954 | Clark | 137—62.5 XR |
| 2,882,931 | 4/1959 | Towler et al. | 137—625.66 |
| 2,969,045 | 1/1961 | Clark | 137—625.69 XR |
| 3,002,532 | 10/1961 | Carlson | 137—625.66 |
| 3,215,158 | 11/1965 | Bass et al. | 137—625.69 XR |
| 3,282,283 | 11/1966 | Takeda | 137—665.63 XR |
| 3,329,159 | 7/1967 | Herion | 137—625.63 XR |

M. CARY NELSON, Primary Examiner

R. J. MILLER, Assistant Examiner